United States Patent
Falk et al.

(10) Patent No.: US 8,495,360 B2
(45) Date of Patent: Jul. 23, 2013

(54) METHOD AND ARRANGEMENT FOR PROVIDING A WIRELESS MESH NETWORK

(75) Inventors: Rainer Falk, Erding (DE); Florian Kohlmayer, Starnberg (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 165 days.

(21) Appl. No.: 12/223,203

(22) PCT Filed: Aug. 1, 2007

(86) PCT No.: PCT/EP2007/057932
§ 371 (c)(1),
(2), (4) Date: Jul. 24, 2008

(87) PCT Pub. No.: WO2008/019942
PCT Pub. Date: Feb. 21, 2008

(65) Prior Publication Data
US 2010/0228980 A1    Sep. 9, 2010

(30) Foreign Application Priority Data

Aug. 17, 2006 (DE) .......................... 10 2006 038 592

(51) Int. Cl.
*H04L 29/06* (2006.01)
(52) U.S. Cl.
USPC ............... 713/155; 713/171; 713/182; 726/4; 380/270
(58) Field of Classification Search
USPC ....................................................... 713/155
See application file for complete search history.

(56) References Cited

U.S. PATENT DOCUMENTS

| | | | |
|---|---|---|---|
| 7,903,817 B2* | 3/2011 | Cam-Winget et al. | 380/270 |
| 2005/0152305 A1 | 7/2005 | Ji et al. | |
| 2006/0026671 A1* | 2/2006 | Potter et al. | 726/7 |
| 2006/0200678 A1* | 9/2006 | Yamada et al. | 713/182 |
| 2006/0236109 A1* | 10/2006 | Krischer et al. | 713/171 |
| 2006/0236377 A1* | 10/2006 | Metke et al. | 726/4 |
| 2007/0005972 A1* | 1/2007 | Mizikovsky et al. | 713/171 |
| 2007/0016780 A1* | 1/2007 | Lee et al. | 713/171 |
| 2007/0101406 A1* | 5/2007 | Zavalkovsky et al. | 726/4 |
| 2007/0112967 A1* | 5/2007 | Lee et al. | 709/229 |
| 2007/0154016 A1* | 7/2007 | Nakhjiri et al. | 380/270 |
| 2007/0160017 A1* | 7/2007 | Meier et al. | 370/338 |
| 2007/0206537 A1* | 9/2007 | Cam-Winget et al. | 370/331 |
| 2007/0220598 A1* | 9/2007 | Salowey et al. | 726/10 |
| 2007/0260885 A1* | 11/2007 | Yegani et al. | 713/171 |
| 2008/0046732 A1* | 2/2008 | Fu et al. | 713/171 |
| 2008/0295144 A1* | 11/2008 | Cam-Winget et al. | 726/1 |

OTHER PUBLICATIONS

IEFT article, Moblie IP Key Derivation using EAP, Feb. 25, 2006, A. Lior, Network Working Group.*
IEEE published article, Secure Nomadic Wireless Mesh (SnowMesh) 802.11 TGs ESS Mesh Networking Proposal, May 15, 2005, Agre, Jonahan, Chen, Wei-Peng, Refaei, Mohamed, Sonalker, Anuja.*

(Continued)

*Primary Examiner* — Ashok Patel
*Assistant Examiner* — Gary Gracia (57) ABSTRACT

A method and an arrangement are provided wherein a newly added mesh node does not require a link to the AAA server for the purpose of authentication. Authentication is carried out using a node which is already present in the mesh network and which has a link to the AAA server.

19 Claims, 4 Drawing Sheets

OTHER PUBLICATIONS

IEEE 802.1X-2004: IEEE Standard for Local and Metropolitan Area Networks—Port-Based Network Access Control; IEEE 802.1X-2004, pp. 37-40; New York; IEEE; 0-7381-4528-8.

IEEE 802.11i-2004: IEEE Standard for Local and Metropolitan Area Networks—Wireless LAN Medium Access Control—Security Enhancements; IEEE 802.11i-2004, pp. 13-15, 19-20; New York; IEEE; 0-7381-4073-2.

Jyh-Cheng C. et al.; Wireless LAN Security and IEEE 802.11i; IEEE Wireless Communications, vol. 12, Issue 1, Feb. 2005, pp. 27-36; IEEE.

Fan Y. et al.; An Improved Security Scheme in WMAN Based on IEEE Standard 802.16; Proceedings, International Conference on Wireless Communications, Networking and Mobile Computing, vol. 2, 23.-26. Sep. 2005, pp. 1191-1194; IEEE.

Agre J. et al.: Secure Nomadic Wireless Mesh (SnowMesh) 802.11 TGs ESS Mesh Networking Proposal, Internet Citation, (online), Mai 2005, XP00790220, gefunden im Internet: URL:http://www.flacp.lfujitsulabs.com/snowmesh.pdf.

Faccin, S. M. et al.; Mesh WLAN Networks: Concept and System Design; IEEE Wireless Communications, vol. 13, Issue 2, Apr. 2006, Seiten 10-17; IEEE.

HMAC: Keyed-Hashing for Message Authentication; by H. Krawczyk of IBM, M. Bellare of UCSD and R. Canetti of IBM; dated Feb. 1997; http://www.ietf.org/rfc/rfc2104.txt.

\* cited by examiner

METHOD AND ARRANGEMENT FOR PROVIDING A WIRELESS MESH NETWORK

CROSS REFERENCE TO RELATED APPLICATIONS

This application is the US National Stage of International Application No. PCT/EP2007/057932, filed Aug. 1, 2007 and claims the benefit thereof. The International Application claims the benefits of German application No. 10 2006 038 592.6 DE filed Aug. 17, 2006, both of the applications are incorporated by reference herein in their entirety.

FIELD OF INVENTION

The invention relates to a method for providing a wireless mesh network and an arrangement for providing a wireless mesh network.

The invention relates to a method and a system for providing a key for encrypting messages between nodes of a mesh network.

BACKGROUND OF INVENTION

A wireless mesh network is a meshed network that is implemented in a Wireless Local Area Network (WLAN), for example. In a mesh network, a mobile node can route data originating from a different mobile node to another mobile node or transmit it to a base station. A mesh network can span large distances, in particular in hilly or difficult terrain. Mesh networks also work more reliably because each mobile node is connected to several other nodes. If one node drops out, due to hardware failure for example, its neighbor nodes look for an alternative data transmission route. Mesh networks may involve fixed or mobile devices.

Figure 1:
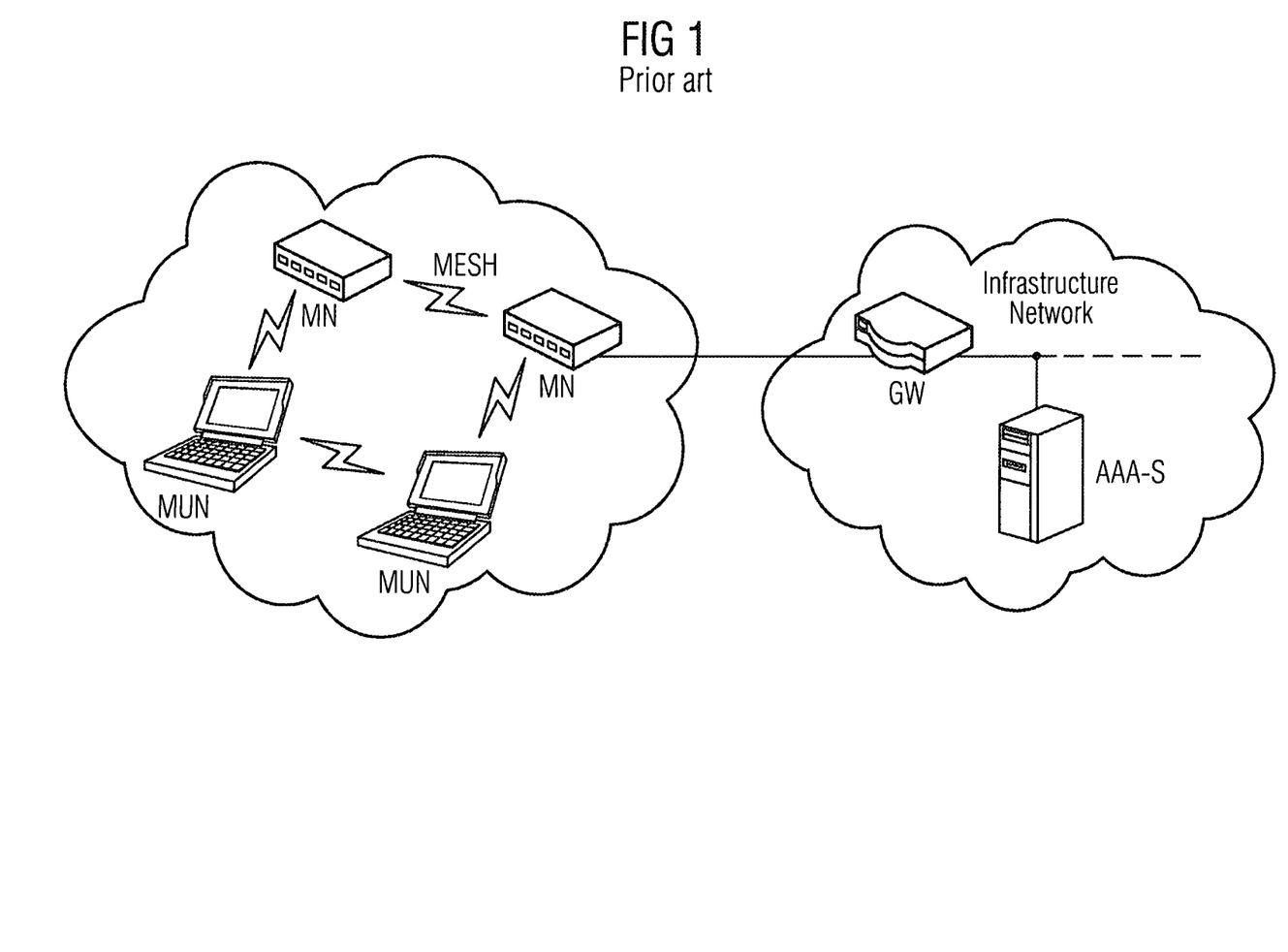
FIG. 1 shows a mesh network scenario.

FIG. 1 shows a diagram of a mesh network according to the prior art. The nodes comprise dedicated mesh nodes (MN) that are part of the network infrastructure. These dedicated mesh nodes may be a fixed base station BS or also a mobile station MS. In addition to the dedicated mesh nodes, the mesh network also comprises mobile end-user devices, i.e. mobile user nodes. The mobile nodes can communicate directly with another mobile node and/or exchange data directly or indirectly via other nodes with a base station BS, which is connected to a gateway GW of a data network. In this system, data packets DP are routed dynamically from one device or node to the next device until the destination device or the gateway GW is reached. In this dynamic routing, the routes on which the data packets DP are transmitted are computed dynamically on the basis of node availability and according to the network usage. The general characteristics of mesh networks are high network coverage, high reliability and economical use of available resources. In wireless mesh networks, the wireless transmission link is conventionally implemented by a WLAN (Wireless Local Area Network). Unlike a Wireless Personal Area Network (WPAN), WLAN networks have higher transmit powers and ranges and provide higher data transmission rates.

Figure 2:
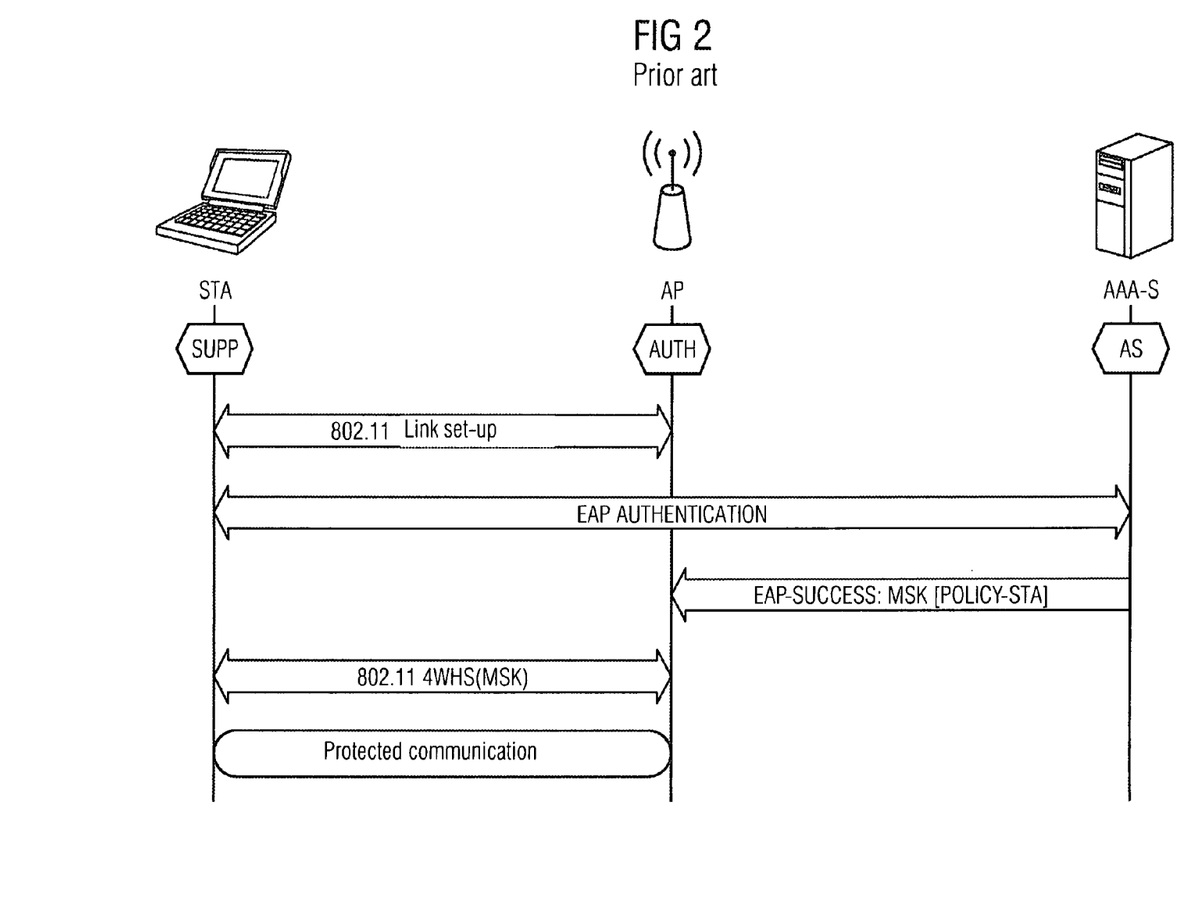
FIG. 2 shows a flow diagram of a mesh authentication process according to Draft D0.01 IEEE802.11s.

The Extensible Authentication Protocol, or EAP as it is known, which is known for instance from IEEE 802.X-2004: "IEEE standard for local and metropolitan area networks—Port-based network access control", ISBN 0-7381-4528-8, Dec. 13, 2004, page 37-40, is used for authentication of nodes or computers. FIG. 2 shows a signal diagram illustrating an authentication procedure in a conventional WLAN network. The EAP protocol is employed in the WLAN to protect access to the network. Various actual authentication procedures, or EAP methods as they are called, can be carried via the EAP protocol e.g. EAP-TLS, EAP-AKA, PEAP-MSChapv2. In the authentication process, a cryptographic key or session key MSK, EMSK (MSK: Master Session Key; EMSK: Extended Master Session Key) is determined, which is subsequently used to protect data communication, for example in link layer encryption. Authentication of a node is performed between the node (supplicant) and an authentication server (AAA server). On successful authentication, the authentication server sends the result of the authentication and the session key MSK originating in the authentication process to the authenticator, for example a WLAN access point AP. Communication between the access node, also referred to as the access point AP, and the authentication server is normally made via the radius or diameter data transmission protocol. In this protocol, the session key MSK is sent as a data attribute to the access point AP as part of an EAP success message. The session key MSK being transmitted is then used over a 802.11 four-way handshake 4WHS as defined in the IEEE 802.11 standard between the node and the access point.

In a conventional network, the access point AP is a trustworthy node, i.e. a node belonging to the network infrastructure. The access point in a conventional network is therefore not an end-user node.

Figure 3:
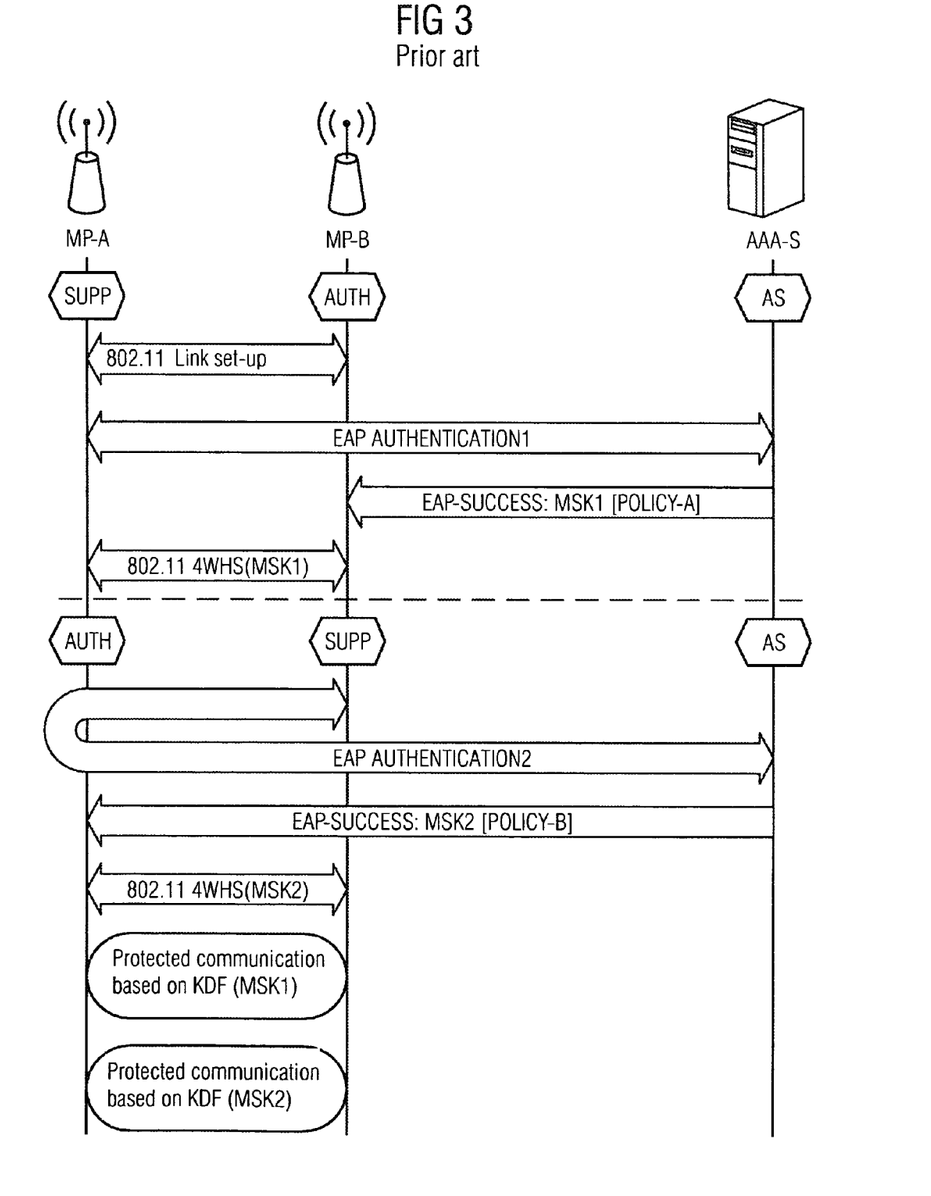
FIG. 3 shows a flow diagram of a WLAN authentication according to the prior art.

FIG. 3 shows the authentication of two nodes MP-A, MP-B in a conventional WLAN network. The two nodes MP-A, MP-B may be two mesh points of a mesh network, for example. In order to set up a data link between the two nodes MP-A, MP-B, first the end node MP-A (as supplicant) authenticates itself with the associated authentication server AS using the EAP data transmission protocol. The node MP-B (authenticator) receives in an EAP success message a session key MSK1. Then the node MP-B performs a four-way handshake with the node MP-A, using the received session key MSK1 in the process. Then the node MP-B (now as supplicant) performs an authentication at the associated authentication server AS, and MP-A (now authenticator) receives a second session key MSK2 in an EAP success message. The node MP-A then performs a four-way handshake with the node MP-B using the second session key MSK2. The two authentications can also be interleaved instead of being performed successively.

Any further communication between the two nodes MP-A, MP-B can be protected by one of the two session keys MSK1, MSK2.

One disadvantage with the procedure shown in FIG. 3 according to the prior art is that both nodes MP-A and MP-B need a link to the authentication server AS, and this is required both in the supplicant role and in the authenticator role. When a new node sets up the first link to a neighbor node, it subsequently still has no connection to an infrastructure network and hence also no link to an authentication server AS. In addition, the authentication server AS must perform two authentications, which increases the load on it.

IEEE 802.11i-2004: "IEEE standard for local and metropolitan area networks—Wireless LAN Medium Access Control—Security Enhancements", ISBN 0-7381-4073-2, Jul. 23, 2004, page 13-15, 19-20, discloses improving the EAP authentication method for the IEEE 802.11 standard.

A WLAN mesh network is known for instance from "Faccin, S. M., among others: Mesh WLAN networks: concept and system design". Wireless Communications, IEEE. Volume 13, Issue 2, April 2006, pages 10-17, with the network elements mutually authenticating one another.

Jyh-Cheng, C, discloses among others in: "Wireless LAN security and IEEE 802.11i." Wireless Communications, IEEE, Volume 12, Issue 1, February 2005, pages 27-36, an expansion of the authentication method known from IEEE 802.11, while in Fan, Y., among others: "An improved security scheme in WMAN based on IEEE standard 802.16." Proceedings, International Conference on Wireless Communications, Networking and Mobile computing, Volume 2, 23-26, September 2005, pages 1191-1194, an expansion of the authentication method known from IEEE 802.16 is described.

US 2005/01 52 305 A1 discloses an authentication method in a WLAN network using an EAP proxy.

SUMMARY OF INVENTION

Hence the object of the present invention is to define an improved method and arrangement for providing a wireless mesh network.

This object is achieved by the independent claims.

In the method according to the invention for providing a wireless local network, in which both stationary communications devices and mobile communications devices designed in accordance with the IEEE 802.11 standard and its derivatives, in particular IEEE 802.15 or IEEE 802.16, are connected as a sub-network in mesh form, and connected to an infrastructure network via a first communications device of the communications devices in such a way that they can exchange authentication messages using the Extensible Authentication Protocol EAP with an Authentication Authorization Accounting AAA server arranged in the infrastructure network, during a registration, a first EAP-compliant procedure is performed in which the first communications device in the role of an authenticator as defined in the EAP protocol communicates with the AAA server when a second communications device is authenticating itself in the role of a supplicant as defined in the EAP protocol. In addition, in the first procedure, the AAA server generates a set of basic encryption information for the sub-network, this basic encryption information relating to the second communications device and being transmitted to the first communications device. Furthermore, during a registration, a second EAP-compliant procedure is performed in which the first communications device in the role of a supplicant as defined in the EAP protocol communicates with the second communications device without communicating with the AAA server, with authentication within the second procedure being conducted on the basis of at least some of the basic encryption information.

As a result of the method according to the invention, a second EAP procedure can be performed without security material for the first communications device previously having been configured on a mesh node of a sub-network that has no connection to the AAA server. Instead, as already known from the WLAN, the mesh node concerned must simply be configured using security material that allows its authentication with a central AAA server.

The basic encryption information preferably contains at least a first encryption key, so that authentication with the AAA server is provided for the second communications device.

The first encryption key is advantageously stored in the first communications device so that it is retained here for future transactions and communications.

Authentication in the second procedure is preferably conducted using the first encryption key as a shared secret key known as a "pre-shared key".

If a first set of parameters defining additional network attributes and assigned to the first communications device, in particular a "policy" such as the maximum bandwidth, QoS reservations, the validity period, user-related account data and/or traffic filter rules, is added to the basic encryption information, then communication between the second communications device and the first communications device can be adapted so that the first communications device implements this set of parameters.

If a second set of parameters defining additional network attributes and assigned to the second communications device, in particular a "policy" such as the maximum bandwidth, QoS reservations, the validity period, user-related account data and/or traffic filter rules, are added to the basic encryption information, then, as known in the prior art, the first communications device can configure itself for communication with the second communications device on behalf of the AAA server.

If the second set of parameters is transmitted as the encrypted first set of parameters protected by a second encryption key, the first communications device cannot manipulate the network attributes that it forwards to the second communications device.

A further advantageous embodiment is provided by deriving a third encryption key that protects communication between the second communications device and the AAA server, it being derived both by the AAA server and by the second communications device. This sets up secure communication with the AAA server, so that the second communications device can also authenticate other mesh nodes.

For this purpose, a configuration of the communication between AAA server and second communications device is preferably transmitted, being encrypted by the AAA server using the third encryption key.

A simple embodiment version in this case is to use the second encryption key for the third encryption key.

Another advantageous embodiment is obtained when communication between the communications devices of the sub-network and AAA server works using a station acting in the nature of a proxy server, omitting the AAA server, on the basis of the third encryption key using the Extensible Authentication Protocol EAP. This decouples the AAA server from the process, which is desirable in some application scenarios, and guarantees that this communication is secure.

A particularly simple and appropriate implementation of this decoupling and reduction in load is provided if the station acts as an interface between sub-network and infrastructure network.

In a further advantageous embodiment of the invention, a fourth encryption key protecting communication between the second communications device and a station acting as an interface between sub-network and infrastructure network is derived, the key being derived by the AAA server and transmitted via an EAP success message as defined in the EAP protocol. This provides an implementation that supports scenarios in which a gateway between a sub-network and an infrastructure network is to be installed that also permits secure communication with this gateway.

It is also advantageous that the first encryption key, the second encryption key, the third encryption key and/or the fourth encryption key is derived from a session key assigned to the sub-network, with this derivation preferably being implemented using a key derivation function based on a Master Session Key MSK formed in accordance with the EPA protocol, or alternatively or additionally based on an Extended Master Session Key EMSK formed in accordance with the EPA protocol, so that simple implementation in EAP structures is guaranteed.

It is preferable here that a function based on a cryptographic hash function, in particular the SHA1, SHA265 or MD5 hash function, is used as the key derivation function. Alternatively or additionally, it is advantageous if a function based on a hash message authentication code function (keyed hash function), in particular HMAC defined by RFC2104, is used as the key derivation function.

An advantageous embodiment of the first encryption key is obtained here when using a key derivation function given by the formula:

$$MA\text{-}Key=HMAC\text{-}SHA1(MSK,\text{"Mesh-Access-Key"})$$

where "MA-Key" denotes the assigned key, "HMAC-SHA1" denotes the keyed hash function HMAC-SHA1, "MSK" denotes the Master Session Key determined in accordance with the EAP protocol and "Mesh-Access-Key" denotes a character string that, in particular, expresses the purpose of the key.

As an alternative to this, the first key can also be determined using the above formula, only with the difference that an "Extended Master Session Key" determined in accordance with the EAP protocol is used instead of the MSK, so that only the AAA server and the second communications device can derive the key, whereas in the event that both the first and the second communications device are meant to derive the key, the MSK-based derivation is preferred.

It is also preferred for determining the second encryption key to use a key derivation function given by the formula $$PP\text{-}Key=HMAC\text{-}SHA1(EMSK,\text{"Mesh-Policy-Protection-Key"})$$

where "PP-Key" denotes the assigned key, "HMAC-SHA1" denotes the keyed hash function HMAC-SHA1 and "ESMK" denotes the "Extended Master Session Key" determined in accordance with the EAP protocol, and "Mesh-Policy-Protection-Key" denotes a character string that, in particular, expresses the purpose of the key.

The object of the invention is also achieved by an arrangement for providing a wireless local network, which has means for implementing the method, this being achieved by the arrangement allowing implementation of the method.

BRIEF DESCRIPTION OF THE DRAWINGS

Further advantages and details of the invention are explained with reference to the exemplary embodiment shown in FIG. 4, which is based on the initial scenarios according to the prior art shown in FIGS. 1 to 3.

DETAILED DESCRIPTION OF INVENTION

Figure 4:
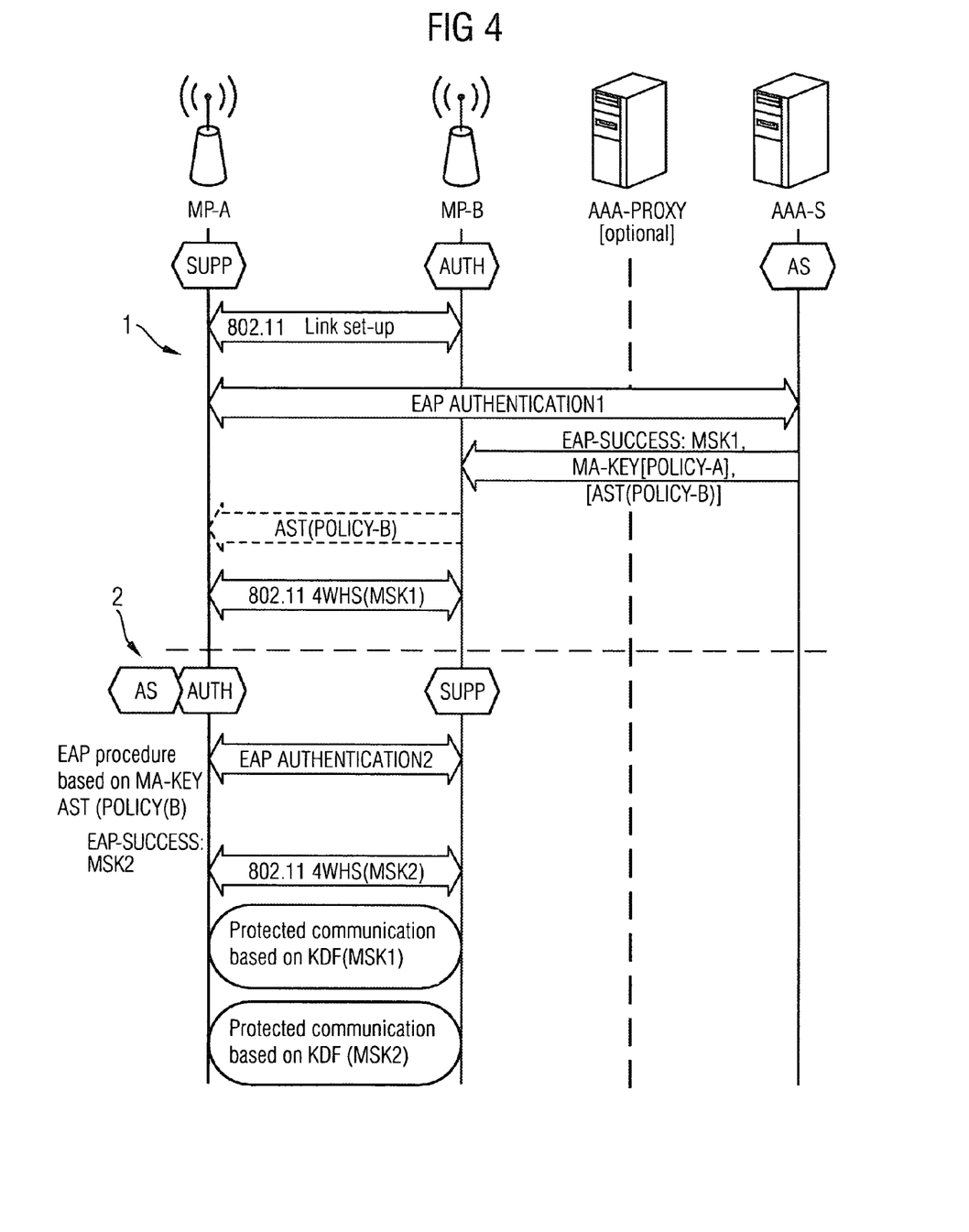
FIG. 4 shows a flow diagram of an exemplary embodiment of the invention.

FIG. 4 shows that, based on a scenario according to the prior art illustrated in FIGS. 1 to 3, a registration is performed such that in a first procedure 1 a device sets up an 802.11 compliant link between a first communications device MP-B and a second communications device MP-A, and subsequently carries out an authentication EAP AUTHENTICATION1 performed in accordance with EAP, as known in the prior art, such that the first communications device MP-B in a role of an authenticator AUTH authenticates the second communications device that is in the role of a supplicant SUPP. Communication in this case is made with an AAA server AAA-S, which acts as an authentication server, and which transmits to the first communications device an EAP success message EAP SUCCESS containing a set of basic encryption information MSK1, MA-Key [POLICY-A] [AST POLICY-B] as the response to this first authentication attempt EAP AUTHENTICATION1, the first communications device then saves this information and only optionally transmits the encrypted message AST (POLICY-B) containing network attributes to the second communications device MP-A, so that a four-way handshake 4WHS-1 (MSK1) can take place in the next step.

According to the invention, with the exchange of authenticator/supplicant roles envisaged in EAP, the second EAP authentication EAP EUTHENTICATION 2 can now take place without the second communications device needing to have or use a link to the AAA Server.

In the second procedure 2, the second EAP authentication EAP EUTHENTICATION 2 is performed on the basis of a first key MA-KEY derived specifically for this purpose according to the invention and optionally on the basis of the protected policy AST (POLICY-B), so that the load on the AAA Server AAA-S is reduced.

It should be realized that after this second EAP authentication EAP EUTHENTICATION 2, which results in an EAP success message (not shown) containing a second session key, the four-way handshake of the second procedure 4WHS-2 (MSK2) can take place so that protected communication on the basis of a first or a second session key can subsequently take place between the communications device MP-B and the second communications device MP-A.

To summarize, one can hence state that an additional mesh access key MA-KEY is configured by the method according to the invention, with this key preferably being derived from the extended session key EMSK by a key derivation function KDF and being transmitted from the AAA server AAA-S to the second communications device MP-B as part of the EAP success message EAP-SUCCESS. This key is derived by the first communications device MP-A and the AAA server AAA-S.

Advantageously, cryptographic hash functions such as SHA-1, SHA256, MD5 or a keyed hash function based on these such as HMAC defined in RFC2104 are suitable in particular for the invention.

For example, a specific implementation that is particularly suitable would be $$MA\text{-}KEY=MHAC\text{-}SHA1(EMSK,\text{"Mesh-Access-Key"})$$

where "Mesh-Access-Key" is a character string that specifies the purpose.

According to the invention, however, other parameters can optionally be included in the key derivation as part of the character string. The MAC address of the authenticator AUTH, i.e. of that mesh node that assumes the authenticator role in the respective EAP procedure, for example the first communications device MP-B in this case, is particularly suitable for this. The MAC address of the supplicant SUPP would also be suitable, i.e. that mesh node that assumes the supplicant role in the EAP procedure, the second communications device MP-A in the figure, provided this information is sent in the first-time EAP authentication EAP AUTHENTICATION 1 to the AAA server AAA-S.

A mesh access key MA-KEY derived in such a way according to the invention is then used as a "pre-issued key" for a second EAP authentication EAP AUTHENTICATION2. A suitable EAP method here is the EAP-PSK method. In addition, the EAP methods currently in development by the IETF Working Group EMU are advantageously also suitable for the method according to the invention (see http:///www.ietf.org/html.charters/emu-charter.html).

Alternatively according to the invention, the mesh access key MA-KEY can also be derived from the session key MSK instead of the extended session key EMSK, with this having the advantage that the second communications device MP-B can derive this key independently.

As regards the policy that the AAA server AAA-S intends for the supplicant SUPP, it can be established according to the invention that the AAA server AAA-S can send a policy POLICY-A intended for the first communications device MP-A to the second communications device MP-B, as already known from the prior art. According to the invention and as shown in the figure, the AAA server AAA-S can also additionally send a policy for the second communications device MP-B POLICY B, with this being implemented by the first communications device MP-A in communication with the second communications device MP-B.

The invention intends that this policy POLICY-B cannot be sent from the AAA server AAA-S directly to the second communications device MP-B, so that it is intended according to the invention to send it initially to the second communications device MP-B, which then sends it on to the first communications device MP-A.

As a further embodiment, the invention advantageously also provides that in order to avoid manipulation of this policy POLICY-B it is protected by a cryptographic checksum (Message Authentication Code, MAC), so that what is known as an "Asserted Policy" AST(POLICY-B) is generated. An additional key PP-KEY (Policy Protection Key) needs to be derived from the extended session key in this case.

A suitable specific embodiment of this derivation is given by the formula:

$$PP\text{-}KEY = HMAC\text{-}SHA1(EMSK, \text{"Mesh-Policy-Protection-Key"})$$

where this additional key PP-KEY is not transmitted from the AAA server AAA-S to the second communications device MP-B.

The protected policy B AST(POLICY-B) is then transmitted from the second communications device MP-B to the first communications device MP-A and cannot be manipulated owing to the cryptographic checksum and the fact that the second communications device MP-B does not know the additional key PP-KEY, even though the protected policy AST(POLICY-B) concerns the second communications device MP-B.

The procedure according to the invention for setting up secure communication with the AAA server AAA-S is described below.

For the situations in which the first communications device MP-A that is registering itself is also to be able to authenticate other mesh nodes, then communication with the AAA server AAA-S must always first be enabled for this communications device.

It is known to configure explicitly the relevant parameters such as the address of the AAA server AAA-S and a shared secret for protecting communication. This is impractical, however, and scales up poorly for a large number of mesh nodes.

Hence according to the invention, a key AAA-Key for secure communication between mesh nodes and the AAA server AAA-S is configured, with the key being derived from the extended session key EMSK according to the invention as follows:

$$AAA\text{-}KEY = HMAC\text{-}SHA1(EMS, \text{"Mesh-AAA-Key"})$$

This key is also computed by the AAA server AAA-S and the first communications device MP-A, and used to protect communication between these two nodes.

Other parameters for communication with the AAA server AAA-S such as the IP address of the AAA server AAA-S or other keying material can be transmitted, also protected by the key AAA-Key, from the AAA server AAA-S to the first communications device MP-A. This can be performed in a similar way to the protected policy AST(POLICY-B), so that a protected configuration AST(AAA-CONFIG) is transmitted, with this being suitably protected by a different key, namely the said AAA-KEY.

According to a further advantageous embodiment, in addition to providing integrity protection, confidentiality is also ensured for the situation in which the AAA-KEY must be transmitted. In addition, it is possible according to the invention also to use for communication an additional derived key as the (radius) shared secret. It is also possible to use the additional key PP-KEY as the AAA-KEY.

According to the invention, secure communication with an AAA-PROXY, which is used in some scenarios in which it is desirable for a mesh node to communicate via an intermediate station AAA-PROXY rather that directly with the AAA server AAA-S, is configured as described below:

In order to enable the functionality of a proxy AAA-PROXY, for example on a mesh gateway, the AAA-KEY is sent as part of the EAP success message EAP-SUCCESS from AAA-S to the AAA proxy. The station AAA-PROXY saves this key for future communication with the first communications device MP-A, which, as described above, can be performed in a secure manner. The station AAA-PROXY preferably removes this attribute before it forwards the message to the second communications device MP-B.

Alternatively, the AAA-KEY could also be derived from the session key MSK rather than the extended session key EMSK. This would have the advantage that the key can be derived not only by the AAA server AAA-S but also by the station AAA-PROXY itself. In this case, however, the session key MSK should be removed by the station AAA-PROXY and replaced by another key derived from the session key MSK. This must be disclosed to the first communications device MP-A via the secure configuration AST(AAA-CONFIG), for example protected by the original session key MSK.

The invention also takes account of scenarios in which it may be desirable to configure additionally a security link to a mesh gateway, this being made possible, as described above for a station AAA-PROXY when the gateway node GW lies in the AAA message path. The gateway node GW can take the relevant key from the success message EAP SUCCESS and use it for communication. In a specific advantageous embodiment, this GW key is represented as follows:

$$GW\text{-}KEY = HMAC\text{-}SHA1(EMSK, \text{"Mesh-GW-Key"})$$

This gateway key GW-KEY can be used in particular for protecting communication between the first communications device. MP-A and the infrastructure network INFRASTRUCTURE NETWORK, for example using IP-SEC, so that intermediate nodes of the mesh network thereby do not have access to the plain text data from the first communications device MP-A.

Hence the invention solves the problem of a mesh-network registration in which only one of the two mesh nodes have connectivity to a central AAA server AAA-S, this being achieved essentially by the following main steps.

a) In a first EAP procedure, that mesh node having connectivity to the AAA server AAA-S assumes the authenticator role AUTH.

In addition, in the first EAP procedure, the security material (key, optionally a policy) used in a second EAP procedure is configured.

This security material is passed to the local authentication server AS in order to enable the second EAP procedure.

This authentication server AS is implemented locally in this case, i.e. on that mesh node (authenticator) having no link to the AAA-server AAA-S.

These EAP procedures can no longer be performed in parallel by this approach according to the invention, but only sequentially in the order given above. This does not present a problem, however, because the two EAP procedures are allowed to be interleaved in any way. Hence the invention can be implemented in existing EAP systems with little effort as any form of interleaving also includes the option of performing them sequentially.

To summarize, one can also state that according to the invention additional security material can also be configured for communication between the first communications device MP-A and the AAA server AAA-S or a station AAA-PROXY or a gateway GW.

The advantages of the invention can be summarized as follows:

One advantage is that the second EAP procedure can take place without security material of another mesh node needing to be configured previously on that mesh node having no link to an AAA-server AAA-S. The invention means that it is only necessary to be configured with security material that will enable it to authenticate itself with the central AAA server AAA-S, as is typical in a standard WLAN station.

This means that the AAA server AAA-S need not be replicated on mesh nodes, so that there is also no longer the need for a large database and hence increased memory capacity. In addition, it avoids the risk of mesh nodes, on which AAA server functionality is replicated, posing improperly as an AAA server for other services such as IPsec VPN based on IKEv2, and hence reducing the security of these services. It also prevents security-related data from other devices being kept on mesh nodes of different trustworthiness, for instance on end-user devices.

The invention claimed is:

1. A method for providing a wireless network comprising:
    a first communication device communicating with an authentication server in accordance with Extensible Authentication Protocol ("EAP") in a first authentication communication, the first communication device communicating with the authentication server in the first authentication communication as an authenticator defined according to EAP protocol;
    the authentication server generating first encryption information, first policy information and second policy information in response to the first authentication communication and transmitting the first encryption information, first policy information and second policy information to the first communication device;
    the first communication device sending the second policy information to a second communication device, at least the second policy information being protected by a cryptographic checksum;
    the first communication device communicating with the second communication device in accordance with EAP in a second authentication communication, the second authentication communication being based on the second policy information, the first communication device communicating with the second communication device in the second authentication communication as a supplicant defined according to EAP and the second communication device communicating with the first communication device during the second authentication communication as an authenticator defined according to EAP and the second communication device not communicating with the authentication sever during the second authentication communication such that the second communication device does not have a link with the authentication server during the second authentication communication, the second authentication communication being processed based on at least a portion of the first encryption information; and
    the first and second communication devices exchanging communication information via a protected communication after the first and second authentication communications are completed; and
    wherein the first encryption information is transmitted to the first communication device via a first EAP success message that comprises the first encryption information and wherein the second communication device receives a second EAP success message that comprises second encryption information.

2. The method of claim 1 further comprising:
    the first communication device and the second communication device executing a first EAP four way handshake prior to the second authentication communication; and
    the first communication device and the second communication device executing a second EAP four way handshake after the second authentication communication.

3. The method of claim 2 wherein the first encryption information comprises a mesh access key and the second encryption information comprises a mesh access key.

4. The method of claim 3 wherein the first encryption information further comprises network attribute data and the second encryption information comprises the network attribute data.

5. The method of claim 2 wherein the first encryption information comprises a first session key and the second encryption information comprises a second session key.

6. The method of claim 5 wherein the first EAP four way handshake is executed using the first session key and the second EAP four way handshake is executed using the second encryption key.

7. The method of claim 6 further comprising the first communication device sending an encrypted message having network attributes to the second communication device prior to the first EAP four way handshake being executed.

8. The method of claim 1 wherein the authentication server is an authentication proxy and the second authentication communication occurs without any involvement of the authentication proxy and without involvement of another authentication server.

9. The method of claim 8 wherein the network attribute data comprises data selected from the group consisting of maximum bandwidth, quality of service reservations, validity period, traffic filter rules, and user related account data.

10. The method of claim 9 wherein the first encryption information comprises a first encryption key.

11. The method of claim 10 wherein the first encryption key is formed based on a formula, the formula being:

$$MA\text{-}Key = HMAC\text{-}SHA1(MSK, Mesh\text{-}Access\text{-}Key)$$

wherein MA-Key designates an associated key, HMAC-SHA1 is a keyed hash function using hash function SHA-1, MSK designates a master session key according to EAP protocol and Mesh-Access-Key is a string identifying a purpose of the key.

12. The method of claim 10 wherein the first encryption key is formed based on a formula, the formula being:

MA-Key=HMAC-SHA1(EMSK,Mesh-Access-Key)

wherein MA-Key denotes the assigned key, HMAC-SHA1 denotes a keyed hash function HMAC using hash function SHA-1, EMSK denotes Extended Master Session Key determined in accordance with the EAP protocol, and Mesh-Access-Key denotes a character string expressing a purpose of the key.

13. The method of claim 1 wherein the first encryption information comprises a first encryption key and the method further comprising the first communication device saving the first encryption information.

14. The method of claim 13 further comprising the authentication sever and the second communication device deriving an encryption key for protecting communications between the second communication device and the authentication server that take place after the second authentication communication.

15. The method of claim 14 wherein the authentication server communicates with the first communication device via a proxy device.

16. The method of claim 14 wherein the first encryption key for protecting communications between the second communication device and the authentication server is based on a formula, the formula being:

AAA-Key=HMAC-SHA1(EMSK,Mesh-AAA-Key)

wherein AAA-Key denotes the assigned key, HMAC-SHA1 denotes a keyed hash function HMAC using hash function SHA-1, EMSK denotes Extended Master Session Key determined in accordance with the EAP protocol, and Mesh-AAA-Key denotes a character string expressing a purpose of the key.

17. The method of claim 14 wherein another encryption key is derived to protect communications between the second communication device and a proxy of the authentication server based on a formula, the formula being:

GW-Key=HMAC-SHA1(EMSK,Mesh-GW-Key)

wherein GW-Key denotes the assigned key, HMAC-SHA1 denotes a keyed hash function HMAC using hash function SHA-1, EMSK denotes Extended Master Session Key determined in accordance with the EAP protocol, and Mesh-GW-Key denotes a character string expressing a purpose of the key.

18. The method of claim 1 wherein the first encryption information comprises parameters associated with the second communication device and network attribute data protected by a second encryption key, and wherein the second encryption information comprises the second encryption key, and the method further comprising:
the first communication device communicating the parameters to the second communication device.

19. The method of claim 18 wherein the second encryption key is formed based on a formula, the formula being:

PP-Key=HMAC-SHA1(EMSK,Mesh-Access-Key)

wherein PP-Key denotes the assigned key, HMAC-SHA1 denotes a keyed hash function HMAC using hash function SHA-1, EMSK denotes Extended Master Session Key determined in accordance with the EAP protocol, and Mesh-Access-Key denotes a character string expressing a purpose of the key.

* * * * *